Nov. 21, 1961     H. LERNER     3,009,156
INDUSTRIAL TACKER

Filed May 18, 1956     13 Sheets-Sheet 1

INVENTOR.
HERSHEY LERNER
BY
*Cm Palmer*
ATTORNEY

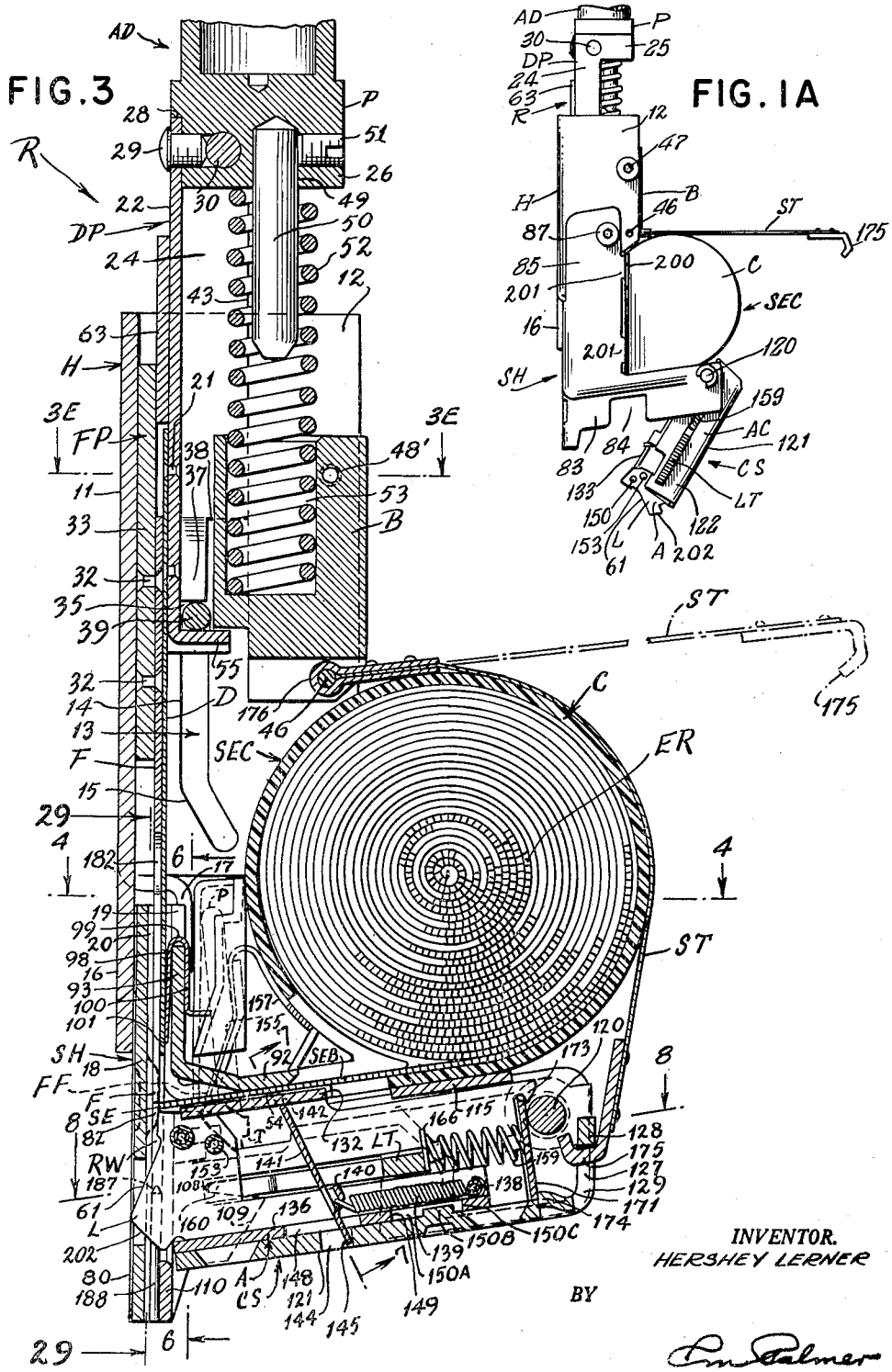

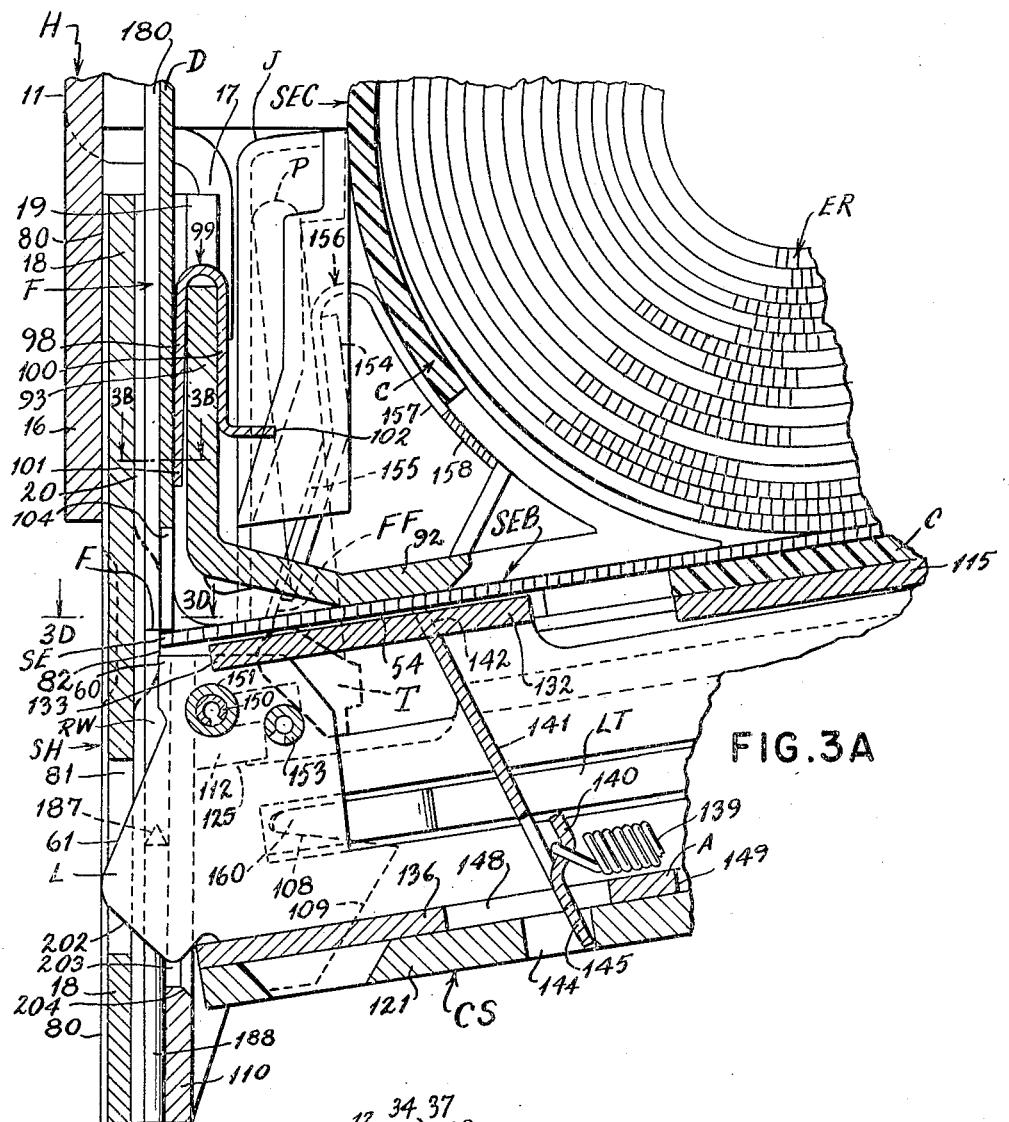
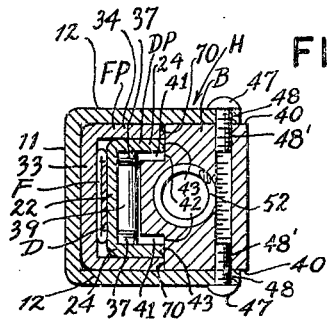

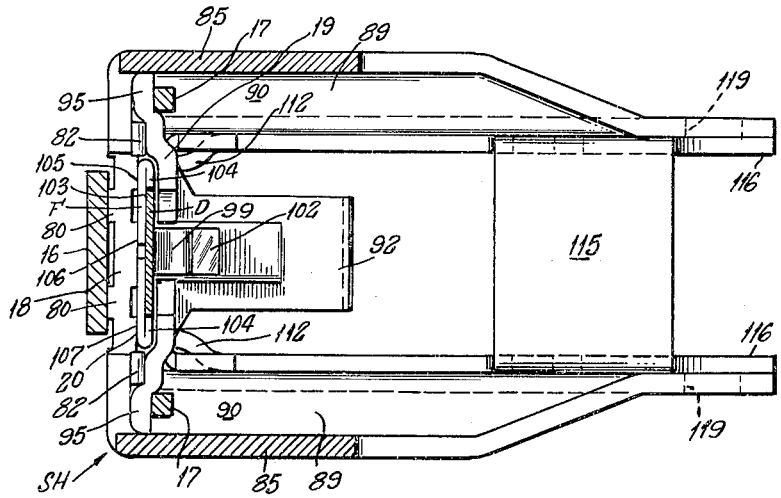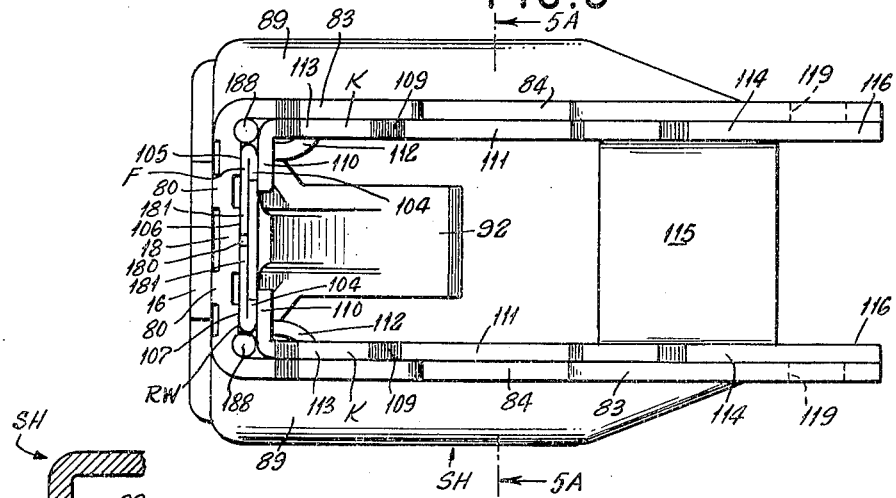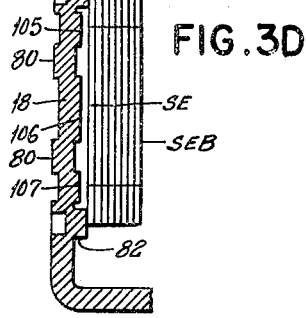

Nov. 21, 1961      H. LERNER      3,009,156

INDUSTRIAL TACKER

Filed May 18, 1956      13 Sheets—Sheet 5

INVENTOR.
HERSHEY LERNER

BY

ATTORNEY

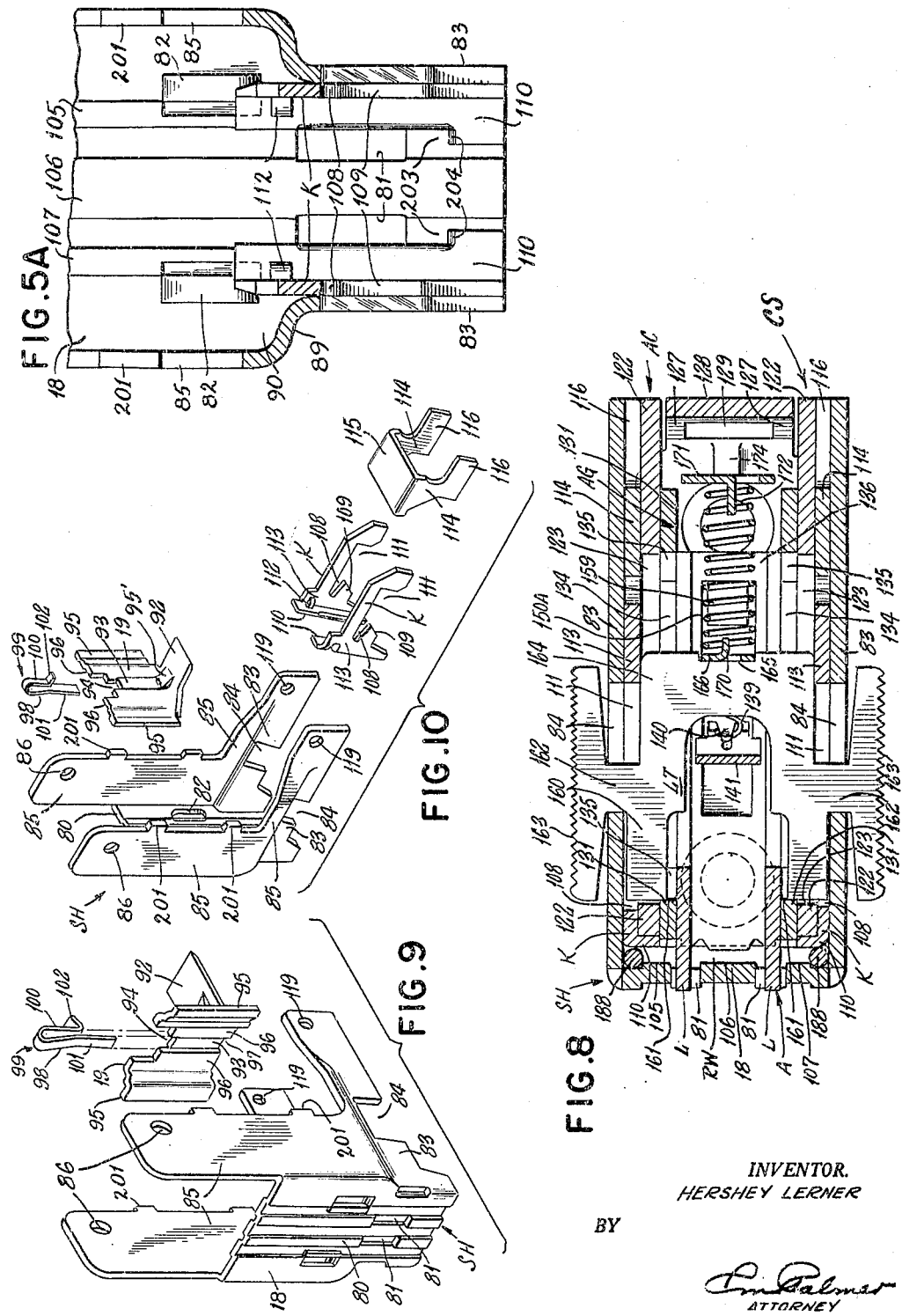

Nov. 21, 1961 H. LERNER 3,009,156
INDUSTRIAL TACKER
Filed May 18, 1956 13 Sheets-Sheet 7
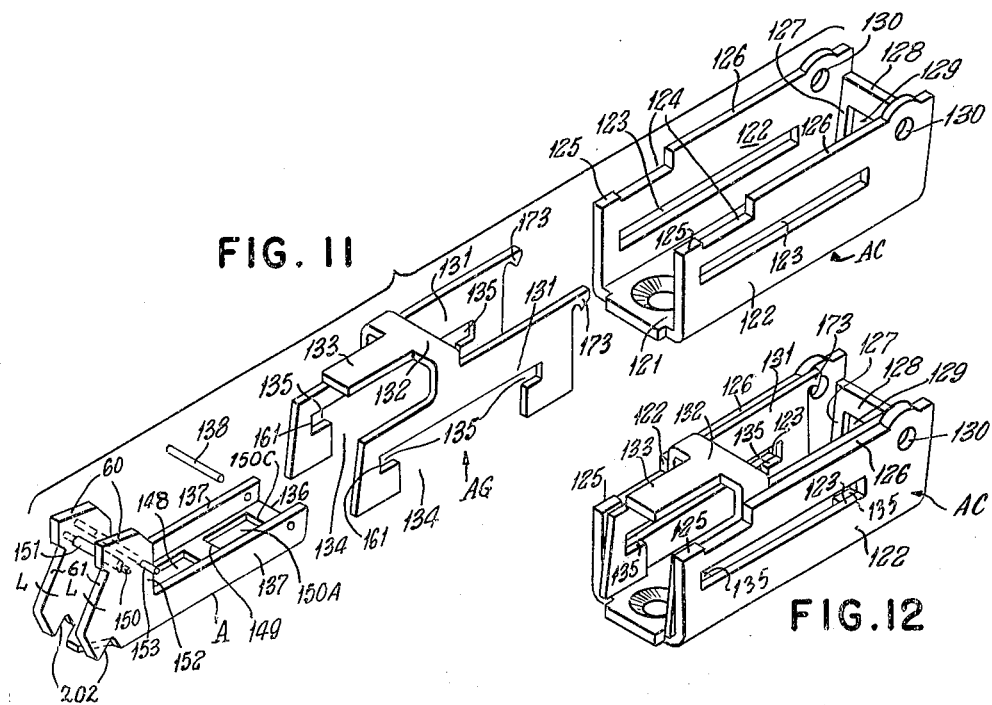
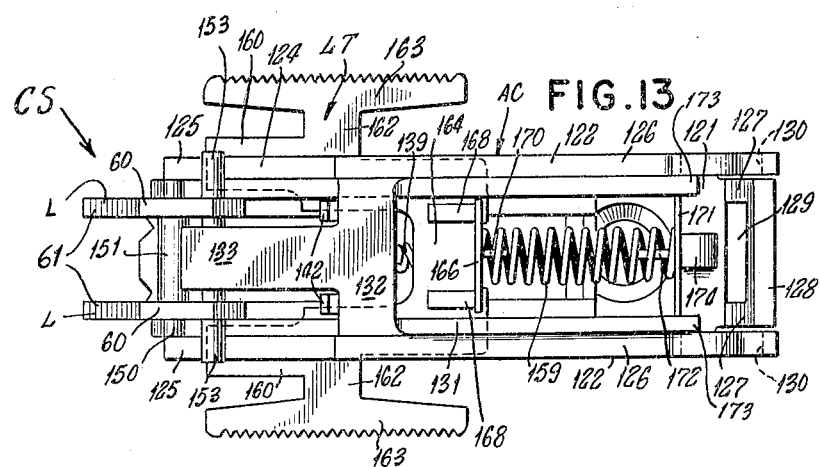
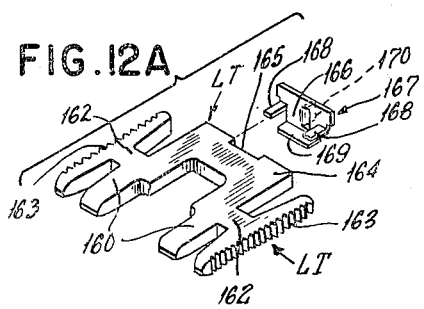
INVENTOR.
HERSHEY LERNER
BY
ATTORNEY Nov. 21, 1961  H. LERNER  3,009,156
INDUSTRIAL TACKER
Filed May 18, 1956  13 Sheets-Sheet 8

INVENTOR.
HERSHEY LERNER
BY
ATTORNEY

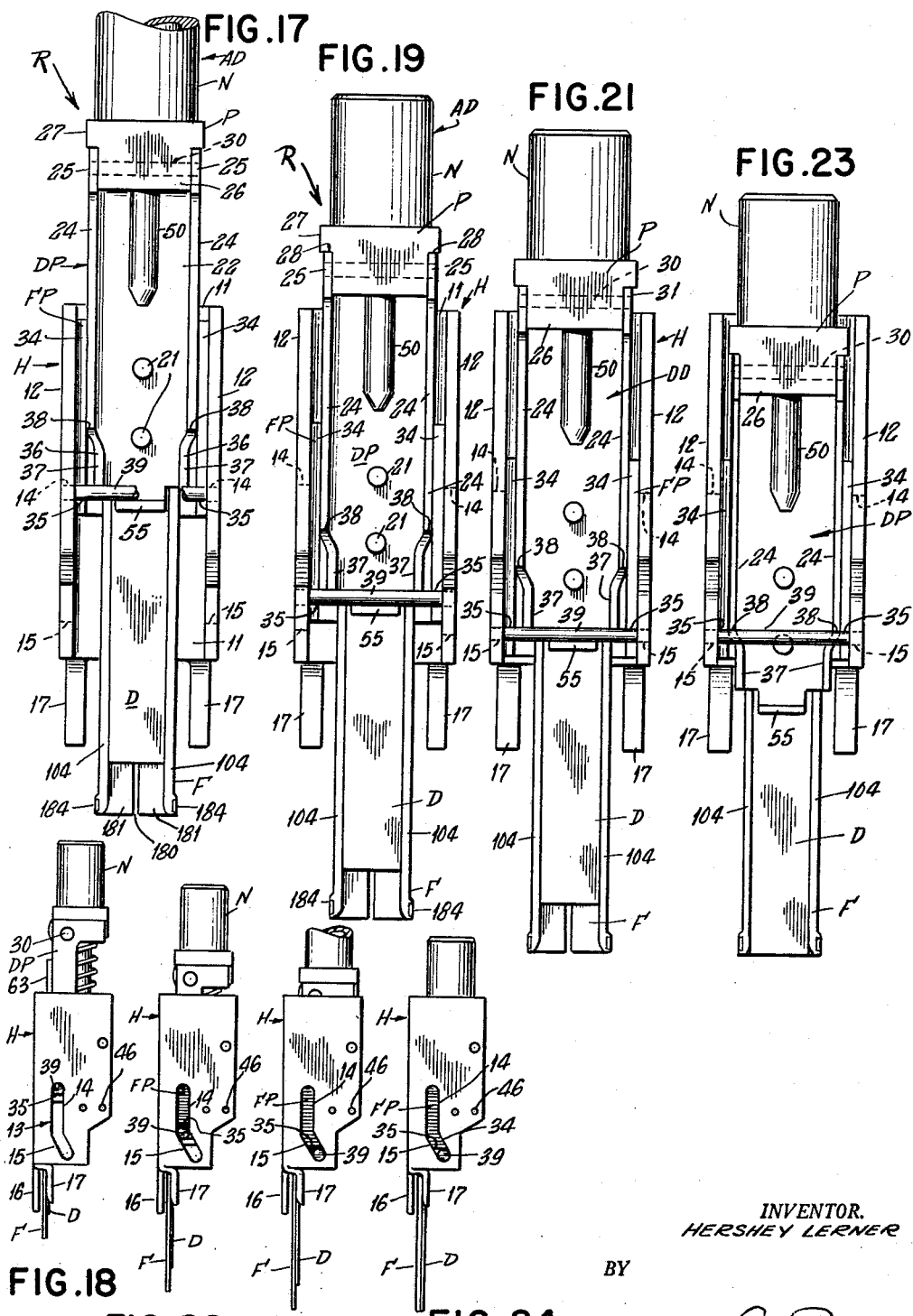

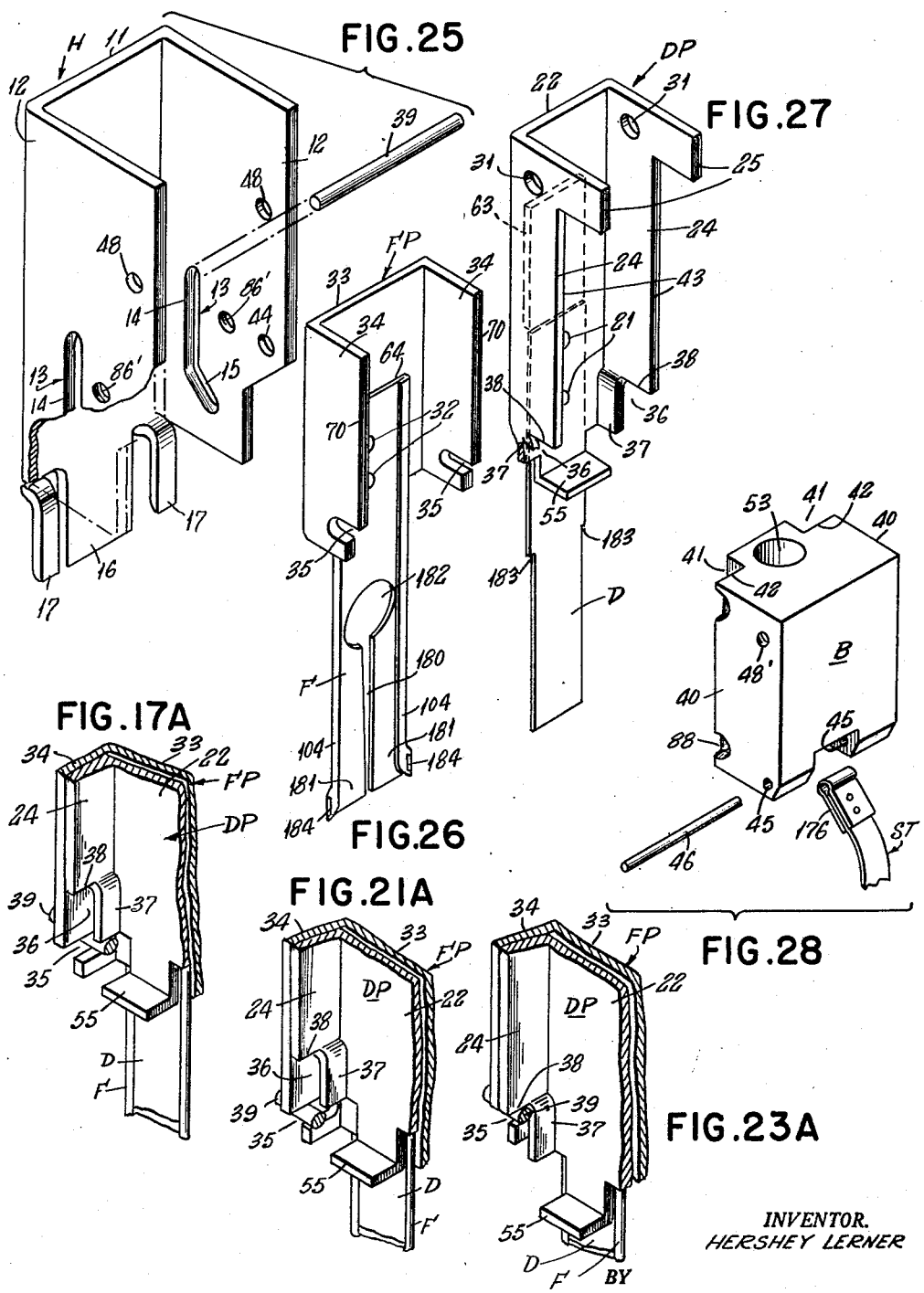

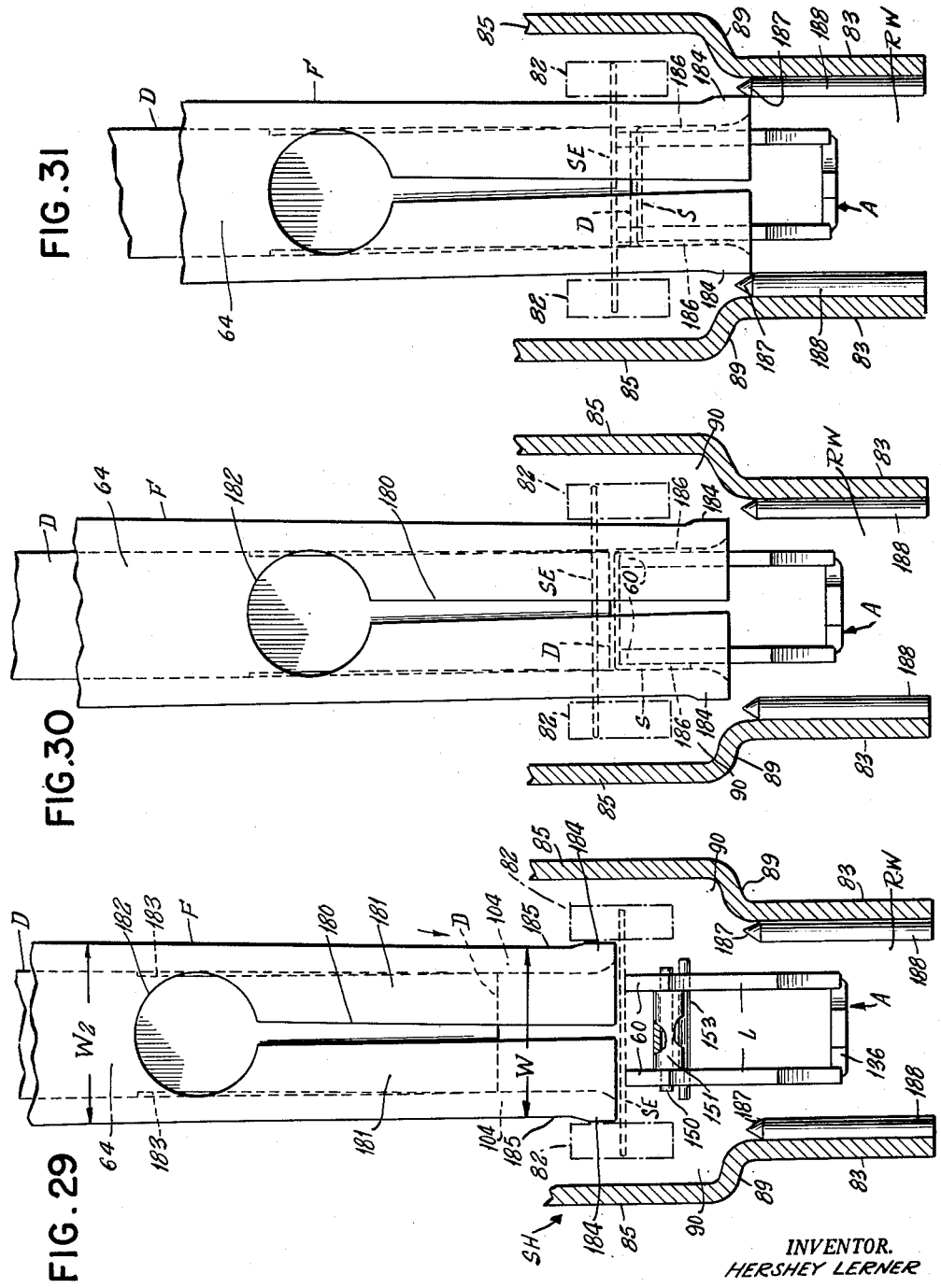

Nov. 21, 1961
H. LERNER
3,009,156
INDUSTRIAL TACKER
Filed May 18, 1956
13 Sheets-Sheet 12
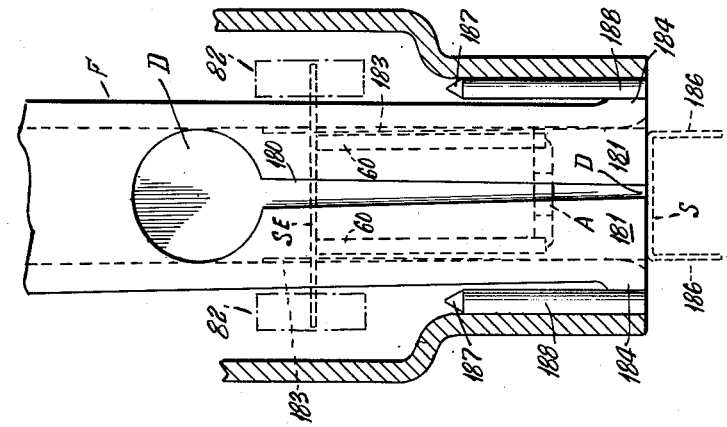
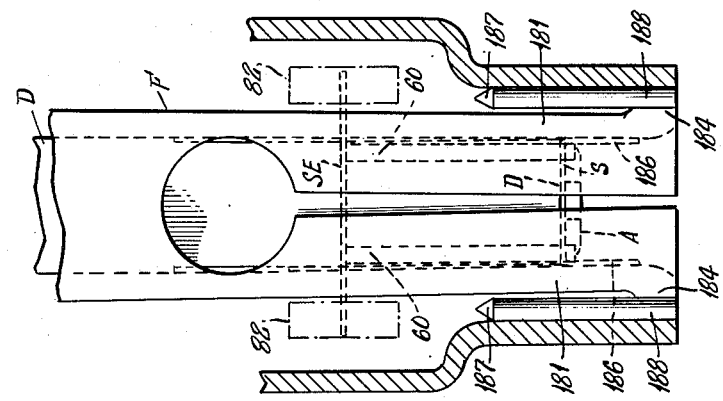
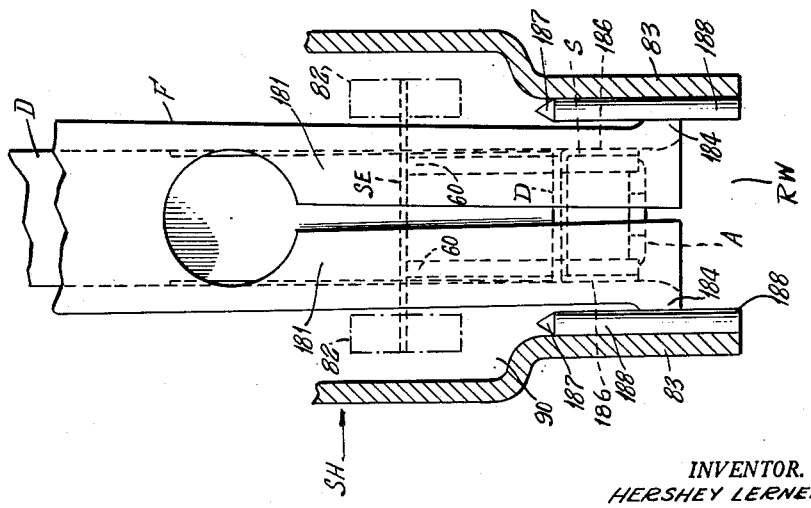
INVENTOR.
HERSHEY LERNER
BY
*Em Palmer*
ATTORNEY Nov. 21, 1961 H. LERNER 3,009,156
INDUSTRIAL TACKER
Filed May 18, 1956 13 Sheets-Sheet 13

INVENTOR.
HERSHEY LERNER

BY

ATTORNEY

United States Patent Office 3,009,156
Patented Nov. 21, 1961

3,009,156
INDUSTRIAL TACKER
Hershey Lerner, Bayside, N.Y., assignor, by mesne assignments, to Inventions Management Corporation, Raleigh, N.C., a corporation of North Carolina
Filed May 18, 1956, Ser. No. 585,853
30 Claims. (Cl. 1—48)

This invention relates to tackers and more specifically to an industrial tacker of the type employing a removable cartridge or magazine permanently carrying swingable and slidable staple element feeding means for effectively advancing towards a staple raceway a front portion of a flexible staple element belt of a wire staple element roll disposed within and appropriately issuing out of the container of the cartridge. The staple elements of the belt constituting the roll are rectilinear. The foremost element of the belt fed into the raceway is first bent over a slidably guided anvil by a forming blade into an inverted U-shaped staple which remains in the forming blade as the anvil is withdrawn from the raceway. Subsequently a driving blade moves relative to the forming blade to drive the formed staple within the forming blade out of the latter and out of a raceway which aids to guide both the forming and driving blades. Heretofore, solid forming blades were utilized. Such solid forming blades are ineffective in adjusting themselves to allow for uncontrollable manufacturing tolerances inherent in the wire staple elements and in the former. Thus in the use of solid forming blades as heretofore, if these forming blades were increased in width to allow for the extreme accumulative tolerances, namely, one limit being for the combined large tolerances in the wire staple elements and in the forming blade, the staple bent by a forming blade would not closely hug the anvil and the legs of such formed staple would be downwardly diverged instead of being perpendicular to the crown or bridge of the staple. The driving blade would then operate to discharge from the raceway the work to be tacked a staple having diverged legs and instead of penetrating the work for maximum effectiveness at times such driven staple would collapse against the work rather than fully penetrate into the latter. If the forming blade width were decreased to allow for the other extreme limit, namely, for combined minimum tolerances of both the wire elements and forming blade, the formed staple would jam against the anvil causing clogging. These disadvantages are overcome by the present invention in the matter of providing a forming blade having a lower split portion defining downwardly converging spaced and resilient leaves, that is, the spaced leaves are "toed in" to normally allow for minimum manufacturing tolerances of the wire staple elements, nevertheless promptly responsive and compensatory, that is, self adjusting on meeting the foremost staple element on the anvil to accommodate such wire elements, having maximum manufacturing tolerances or in other words by employing the resilient staple forming leaves, such leaves accommodate to the smallest combination of tolerances of the wire elements and forming blade and self adjust themselves to the largest combination of such tolerances. Another object resides in the provision of means to preclude spreading of the resilient leaves of the forming blade after the staple has been formed against the anvil to permit the formed staple to hug the anvil so that its legs will be maintained perpendicular to the bridge. Another object is to resist spreading of the former leaves while the formed staple is driven from the former blade and from the raceway by the driving blade. Another object is to provide resilient means coacting with the driving blade to maintain the latter yieldingly against the forming blade and the latter yieldingly against the inside bearing surfaces of the front wall of a suitable sheath or casing in part constituting the raceway. Another object is realized in the provision of spaced keepers within the sheath having spaced stops cooperating with the anvil carrier of a swingable case to limit insertion of the latter between the keepers whereupon spring controlled slidably guided latch means automatically and removably interlocks with the keepers to hold the swingable case within the sheath against the spaced stops and against accidental falling therefrom. Another object is to provide spaced projections or stops struck out of the front wall of the sheath to positively position the foremost element of the staple element belt in alinement with the raceway. Another object is concerned with a serviceable and novel slidably guided ram comprising a forming plunger carrying the split forming blade and a driving plunger carrying the driving blade, and means for coupling the forming and driving plungers to permit both the forming and driving blades to move in unison until the completion of the downstroke of the forming blade but before the completion of the downstroke of the driving blade. Another object resides in automatically uncoupling or unlocking the driving plunger from the forming plunger at the conclusion of the downstroke of the forming blade to permit the driving blade to complete its downstroke for expelling the formed staple from the raceway. Another object is to utilize a pin slidably guided in spaced cam slots of the ram housing for automatically coupling and uncoupling the former and driver plungers. Another object is to provide a swingable block interposed and effectively maintained between the sides of the ram housing and constituting bearing means for slidably guiding the driving plunger.

The disclosure of this application includes subject matter in common with my co-pending application Serial Number 349,862, filed April 20, 1953, now United States Patent Number 2,938,212.

Other important objects and functional and structural advantages of the invention will be evident from the following specification considered with the accompanying drawings wherein:

FIG. 1A is a view similar to FIG. 1 but on a smaller scale illustrating the swingable case dropped out of the sheath and the swingable strap unlocked from the swingable case to permit removal of the staple element cartridge or magazine from the sheath.

FIG. 3 is a transverse sectional view on the line 3—3 of FIG. 2 on a larger scale.

FIG. 3A is an enlarged fragmentary view of FIG. 3.

FIG. 3B is a fragmentary sectional view taken on the line 3B—3B of FIG. 3A.

FIG. 3C is a view similar to FIG. 3B but with the driving blade removed from the former blade.

FIG. 3D is a fragmentary sectional view taken on the line 3D—3D of FIG. 3A, on a reduced scale.

FIG. 3E is a horizontal sectional view on the line 3E—3E of FIG. 3 but on a smaller scale.

FIG. 4 is a transverse sectional view on the line 4—4 of FIG. 3, without however, for purpose of clarity, illustrating the staple element cartridge or the swingable case.

FIG. 5 is a bottom view of FIG. 4, that is, of the sheath without its swingable case.

FIG. 5A is a cross sectional view on the line 5A—5A of FIG. 5, illustrating the fixed keepers but without showing the guide plate secured to the front wall of the sheath.

FIG. 8 is a horizontal sectional view on the line 8—8 of FIG. 3.

FIG. 9 is an exploded perspective view on a smaller scale of the sheath, guard plate, and looped spring.

FIG. 10 is an exploded perspective view of the sheath, guard plate, looped spring, the spaced keepers, and the cartridge or magazine seat.

FIG. 11 is an enlarged exploded perspective view of the swingable case illustrating the anvil, anvil guide and anvil carrier.

FIG. 12 is a perspective view of the swingable case partly assembled, and illustrating the anvil guide secured within the anvil carrier.

FIG. 12A is a perspective exploded view of the slidably guided latch and its abutment clip.

FIG. 13 is a plan view of the fully assembled swingable case.

FIG. 17 is a rear view of the ram in the fully raised positions of the former and driver plungers, however with the bearing block and its associated spring removed from the ram housing for purposes of illustrating the internal construction.

FIG. 17A is a fragmentary perspective view of FIG. 17 exhibiting the former and driver plungers locked or coupled to move in unison.

FIG. 18 is a side view of FIG. 17 on a smaller scale.

FIG. 19 is a view similar to FIG. 17 but showing the slidably guided ram in an intermdeiate position on its downward stroke.

FIG. 20 is a side view of FIG. 19 on a smaller scale.

FIG. 21 is a view similar to FIG. 19, however exhibiting the ram at the conclusion of the downstroke of the forming blade at which time the driving plunger is automatically unlocked from the forming plunger.

FIG. 21A is a fragmentary perspective view of FIG. 21, showing the locking pin uncoupled or unlocked from the driving plunger.

FIG. 22 is a side view of FIG. 21 on a smaller scale.

FIG. 23 is a side view similar to FIG. 21 but with the driving blade of the ram having completed its full downstroke.

FIG. 23A is a fragmentary perspective view of FIG. 23 illustrating the driving plunger unlocked from the former plunger.

FIG. 24 is a side view of FIG. 23 on a smaller scale.

FIG. 25 is a perspective and broken view of the ram housing and the slidably guided pin for removably coupling or locking the driving plunger with the forming plunger.

FIG. 26 is a perspective view of the forming plunger carrying its split former blade.

FIG. 27 is a perspective view of the driving plunger permanently carrying the staple driving blade.

FIG. 28 is an exploded perspective view of the swingable guide block, its fulcrum pin and in part the locking strap for removably holding the cartridge or magazine on the sheath.

FIG. 29 is an enlarged sectional view along the front transverse face of the split former blade taken on the line 29—29 of FIG. 3.

FIG. 30 is a view along the lines of FIG. 29, illustrating the formed staple within the split former blade and the latter moving downwardly to meet the resisting and confining fixed posts.

FIG. 31 is a view similar to FIG. 30 exhibiting the split former or forming blade in position between the fixed confining posts which resist spreading of the lower end of the former blade to maintain the spaced legs of the formed staple substantially perpendicular to the crown of the staple.

FIG. 32 is a view along the lines of FIG. 31 showing the former blade about to complete its down stroke and held against spreading by the confining fixed posts within the raceway.

FIG. 33 is a view along the lines of FIG. 32 illustrating the former blade completing its downstroke at which time the driving blade is about ready to drive the formed and confined staple from the forming blade.

FIG. 34 is similar to FIG. 33, depicting the driving blade fully ejecting the formed staple from the former blade and the raceway.

Figure 38:
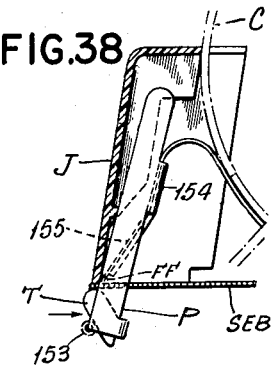
Figure 39:
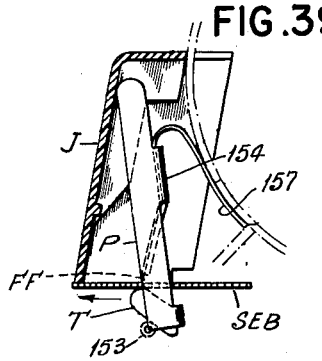
Figure 36:
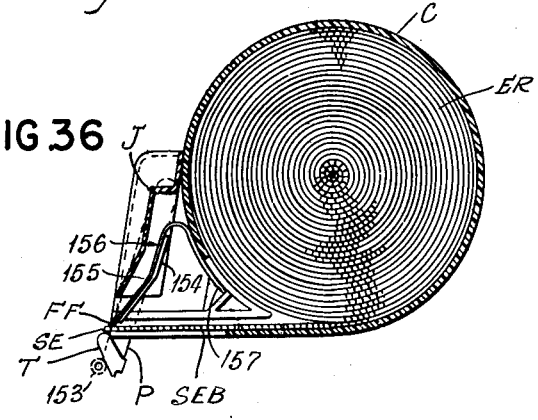
FIG. 36 is a transverse sectional view on the line 36—36 of FIG. 35.
Figure 37:
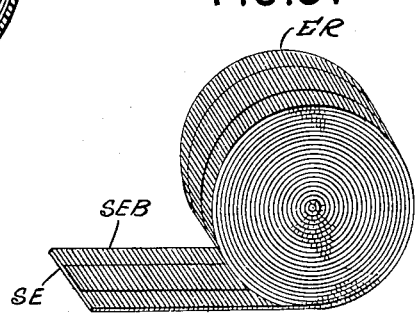
FIG. 37 is a perspective view of the staple element roll.

FIG. 38 is a fragmentary view of FIG. 36 exhibiting the actuating pin of the linear guided anvil about to operate the swingable and slidable staple element feeding means, that is, to shift the pawls and feeding fingers thereof idly and rearwardly over the staple element belt, and FIG. 39 is a view similar to FIG. 38, however showing the feeding means about to advance the staple element belt forwardly.

The tacker according to the invention comprises; a sheath SH for removably supporting a staple element cartridge or magazine SEC containing the flexible staple element roll ER; a swingable case CS adapted to support the front end of the staple element belt SEB which has been previously wound to constitute the staple element roll ER; and a ram R slidably guided by housing H in which the driving plunger DP and forming plunger FP are slidably disposed, the arrangement being such that forming plunger FP carries the split forming blade F which initially bends the foremost rectilinear staple element SE of belt SEB about the slidably guided anvil A of case CS to form an inverted U-shaped staple S while a driving blade D carried by driving plunger DP subsequently drives the formed staple S through and out of raceway RW. Sheath SH and swingable case CS above referred to include improvements over the Pneumatic Tacker shown in my Patent Number 2,938,212. The staple element roll ER is of the type disclosed in U.S. Patent No. 2,743,445, granted May 1, 1956, for Flexible Cartridges or Refills for Stapling Machines. The staple element cartridge or magazine SEC permanently carrying staple element feeding means including spaced swingable and slidable pawls P comprising spaced tooth means T and carrying spaced resilient fingers FF of an inverted U-shaped leaf spring are disclosed in my co-pending application S.N. 561,897, filed January 27, 1956, for Staple Element Cartridges or Refills.

The ram

The ram broadly designated R (FIGS. 1, 2, 14 to 28) comprises a U-shaped housing H (FIG. 25) provided with the front wall 11 and the spaced rearwardly extending walls 12 which are interrupted by the transversely alined offset slots 13, each comprising a vertical upper gap 14 and a communicating lower and rearwardly and downwardly extending cam portion or gap 15. Depending from the lower part of front wall 11 is lip 16. Spaced from and to the rear of lip 16 are the transversely spaced fingers 17 which are integral with front wall 11 but offset relative thereto.

Lip 16 and the spaced fingers 17 (FIGS. 3, 4 and 6) constitute means for straddling and engaging front wall 18 of sheath SH and spaced margins 95 of the fixed rear guard plate 19 characterizing with front wall 18 the vertical guideway 20 (FIGS. 3, 3A and 4) in which the split staple former blade F and staple driving blade D are slidably guided.

Driving blade D has its upper portion anchored by rivets 21 (FIGS. 3 and 27) to the lower part of the front wall 22 of the U-shaped carrier or driving plunger DP comprising rearwardly extending sides 24 provided at their upper portions with the alined overhanging extensions 25. An adapter generally denoted AD (FIGS. 1A, 3, 14, 17, 19 and 21) comprises the square shaped plug P which has its reduced portion 26 closely and nonrotatably received within the U-shaped driving plunger DP. Thus sides 24 and overhanging extensions 25 straddle reduced portion or boss 26. The substantially squared head 27 of plug P defines shoulders 28 with reduced portion 26. These shoulders 28 rest against the upper faces of spaced sides 24 and extensions 25 of the U-shaped driving plunger DP. Integral with and extending upwardly from plug P is the hollow nipple N which is adapted to be received in a suitable reciprocating head of an appropriate reciprocable press (not shown). A pin 30 frictionally fits into alined openings 31 in spaced sides 24 and in the reduced portion 26 of Plug P, to secure plug P to the driving plunger DP. Threaded screw 29 clamps against pin 30 in its set position.

The split former blade F has its body portion or web 64 (FIG. 26) secured by rivets 32 (FIGS. 3 and 26) to the U-shaped former plunger FP; comprising front wall 33 from which extends the spaced side walls 34 provided at their lower portions with alined notches 35.

The U-shaped driving plunger DP is nested within the U-shaped former plunger FP, that is, spaced walls 24 of driving plunger DP are closely but slidably guided by the spaced sides 34 of the former plunger FP. It should be observed that the lower portions of the spaced sides 24 of driving plunger DP are provided with transversely alined recesses 36 (FIGS. 15 and 27) defining terminal limbs 37 while the top faces 38 of recesses 36 (FIG. 23A) define means cooperating with the displaceable slidably guided locking pin 39 to limit the downward stroke of the driving plunger DP relative to the forming plunger FP.

Ram housing H slidably guides the U-shaped former plunger FP (FIG. 3E) and its spaced sides 12 closely guide the spaced sides 34. Block B coacts to slidably maintain the driving plunger DP nested within forming plunger FP and the latter slidably against the front 11 and side walls 12 of housing H. To this end, block B has its spaced sides 40 fitting closely between the spaced sides 12 of housing H and is provided with the reentrant recesses 41 (FIGS. 3E and 28) defining shoulders 42 which serve as rectilinear bearing faces against which faces 43 of spaced sides 24 of the driving plunger DP and faces 70 of spaced sides 34 of forming plunger FP are slidably displaced.

Within alined apertures 44 (FIG. 25) in spaced sides 12 of housing H, and the alined openings 45 (FIG. 28) in the bottom part of block B is fulcrum pin 46 (FIGS. 1, 1A and 28) having its ends appropriately upset to prevent longitudinal displacement thereof. Fulcrum pin 46 swingably supports bearing block B which is adapted to be retained in a fixed position for adequately slidably guiding driving plunger DP and former plunger FP relative to housing H by threaded screws 47 passing through openings 48 in sides 12 of housing H and in spaced threaded apertures 48' of block B (FIGS. 3E and 28).

Depending boss 26 of plug P is provided with an opening 49 (FIG. 3) frictionally receiving the upper part of stud or pin 50 also retained in place by set screw 51. The upper end of spring 52 surrounds pin 50 while its lower part is disposed within wall or opening 53 in block B. Spring 52 is helical and normally expanded, abutting boss 26 of plug P, thus normally holding driving plunger DP elevated, whereby the former blade F is normally held above the foremost staple element SE (FIGS. 3 and 3A) of the staple element belt SEB slidably guided in gap or channel 54 communicating with the vertical raceway RW and upper passageway 20.

Figure 1:
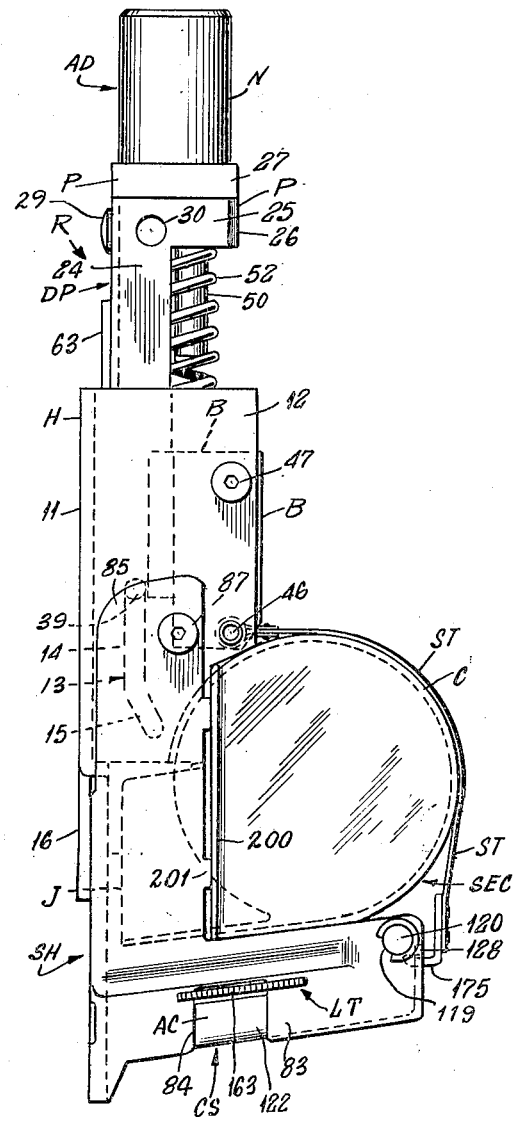
FIG. 1 is a side elevational view of the industrial tacker according to my invention, illustrating the swingable case closed within the sheath and removably locked against accidental opening and also illustrating the removable cartridge or magazine held against the seat of the sheath by a resilient strap disconnectably engaging the swingable case.
Figure 14:
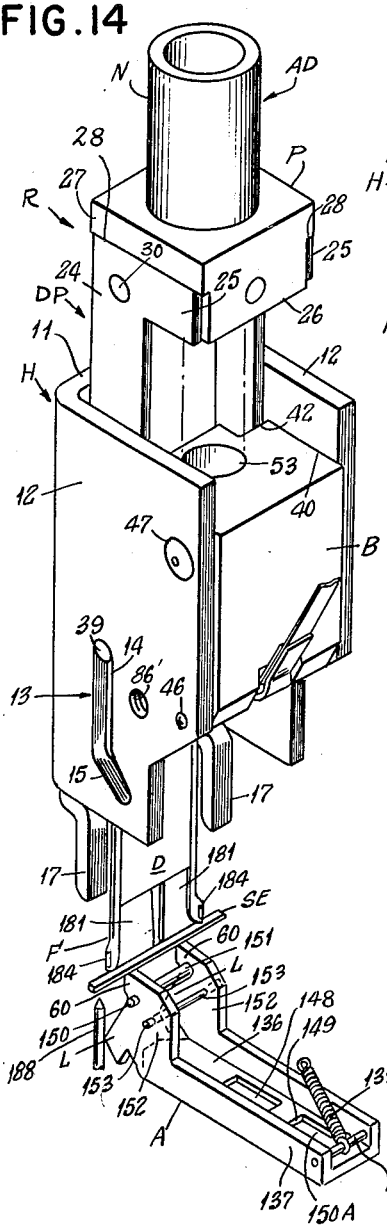
FIG. 14 is a fragmentary perspective view of the tacker illustrating the slidably guided ram fully raised and with the foremost rectilinear staple element on the anvil heads just below and in alinement with the reciprocable staple forming split blade.
Figure 15:
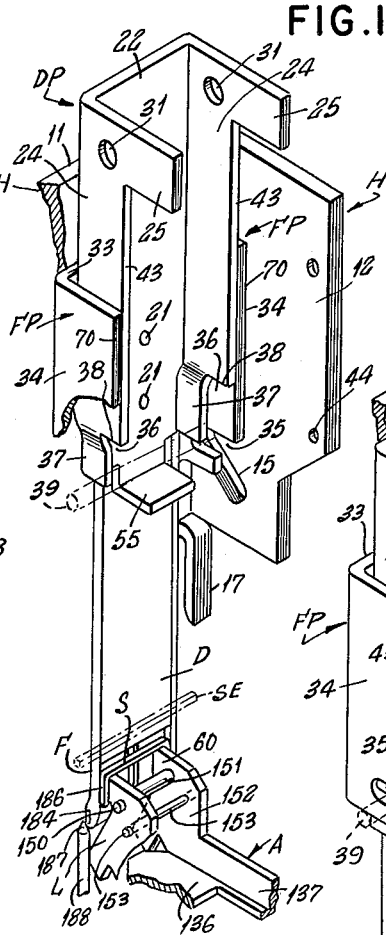
FIG. 15 is a fragmentary broken view of FIG. 14, however illustrating an intermediate position of the ram on its downstroke at which time the staple forming blade has bent the foremost staple element into an inverted U-shaped staple over spaced anvil heads and at which time the forming and driving plungers are still locked to move in unison.
Figure 16:
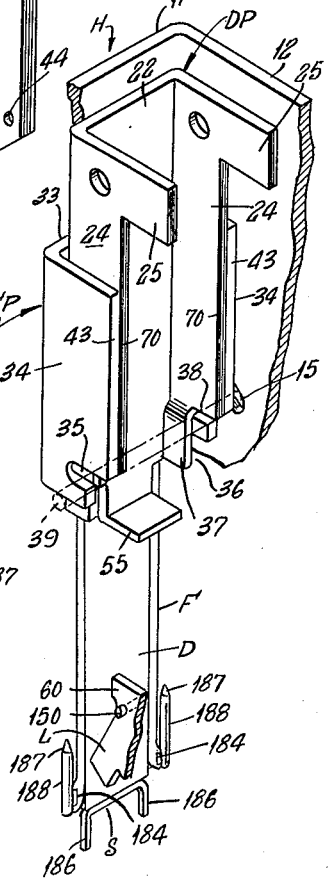
FIG. 16 is a fragmentary view of FIG. 14 showing the ram at the completion of the downward stroke of the driving blade at which time the driving plunger remains unlocked from the former plunger.

In the normal raised position of driving plunger DP, locking pin 39 is at the upper part of slots 14 of spaced sides 12 of housing H (FIGS. 1, 3 and 14). At this time, the driver plunger DP and forming plunger FP are locked or coupled by pin 39, namely, to move in unison or bodily until unlocked, that is, pin 39 is within alined and spaced gaps 35 (FIGS. 17, 17A, 17B and 18) of sides 34 of former plunger FP and between the spaced limbs 37 and rearwardly extending lip 55 integral with the lower part of front wall 22 of driving plunger DP, that is, if a downwardly directed force be applied to adapter AD, limbs 37 act downwardly on pin 39 and the latter acts downwardly against the lower faces of gaps 35 to bodily shift former plunger FP with driving plunger DP on each downward stroke of adapter AD. During each downward stroke, the split forming blade F (FIG. 15) bends the foremost staple element SE of belt SEB against the sides of the spaced anvil heads 60 of a slidably guided anvil A to form the inverted U-shaped staple S. As adapter AD continues downwardly the lower part of the former blade F meets the cam faces 61 of spaced lips L of anvil A, causing the latter to shift rearwardly, that is, withdrawn from the former F, consequently leaving the formed staple S within the U-shaped former blade or former F and within the guideway RW. Eventually locking pin 39, for the former and driving plungers, as it moves downwardly, strikes the inclined or cam surfaces of spaced gaps 15 of housing H thereby bodily shifting pin 39 rearwardly and to the rear and out of the path of travel of spaced limbs 37 of driving plunger DP when pin 39 reaches the bottom part of gaps 15 (FIGS. 21, 21A, 21B, 22), thus unlocking pin 39 from driving plunger DP at which time forming blade F has completed its full down stroke. Thereafter driving plunger DP moves downwardly (FIGS. 16, 23, 23A, 23B and 24) relative to forming plunger FP so that driving blade D drives formed staple S out of the split forming blade F and of course downward displacement of the driving plunger DP however is limited by shoulders 38 striking locking pin 39 when the latter is at the bottom part of inclined gaps 15. Obviously on the downward stroke of driving plunger DP, spring 52 associated with bearing block B is compressed by plug P.

After completion of the driving stroke and upon removal of the downwardly directed force formerly applied to plug P to depress ram R, spring 52 automatically returns or retracts plug P to its normal raised position, that is, spring 52 expands, consequently elevating driving plunger DP, thereby moving lip or tongue 55 upwardly to meet and actuate locking pin 39 (FIGS. 23, 23A, 23B) from its lowest and most rearward position in alined cam gaps 15 to its uppermost position in these gaps 15 (FIGS. 15 and 18) at which time pin 39 again falls under spaced limbs 37 of driving plunger DP and into the lower parts of alined gaps 14. In such relation, pin 39 again locks driving plunger DP with forming plunger FD whereby both of the latter move in unison on the remainder of the return stroke of driving plunger DP. Briefly recapitulating, on each cycle of operation of ram R the driving and forming plungers are coupled by pin 39 until forming blade has completed its full down stroke and thereafter the driving and forming plungers are uncoupled to permit the driving plunger to complete its down stroke and relative to the forming plunger. On the first part of the return stroke, the driving and forming plungers remain uncoupled and on the latter part of such return stroke, they are again coupled by pin 39. To prevent wobbling of and provide better balance to driving plunger DP as it is displaced relative to forming plunger FP, fixed plate 63 is suitably brazed, that is, fixed to the front wall 22 of driving plunger DP.

*The sheath*

Sheath SH (FIGS. 1, 3A, 3D, 6 and 9) comprises front wall 18 which is indented to define spaced reinforcing ribs 80 interrupted by spaced relief slots 81 (FIGS. 2, 3A, 3D) for receiving spaced lips or cam shaped portions L of slidably guided anvil A hereinafter more particularly set forth. The upper part of front wall 18 (FIGS. 1 and 9) is wider than its lower part and is indented to provide spaced projections or stops 82 (FIGS. 3, 3A, 3D, 4, 6 and 29 to 34). Stops 82 limit forward displacement of the staple element belt SEB to aline the foremost staple element SE under former blade F in the normally raised position of ram R (FIG. 3), that is, these stops are adjacent front end of guide slot 54.

Figure 35:
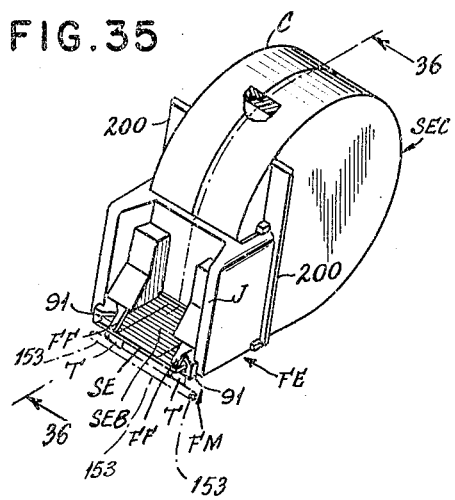
FIG. 35 is a perspective view of the staple element cartridge, magazine or refill shown in FIGS. 1 and 3.

Integral with reduced part of front wall 18 are the rearwardly extending sides 83 (FIGS. 9 and 10) interrupted by transversely alined gaps 84. Laterally overhanging sides 83 and projecting upwardly as well as rearwardly and integral with the upper part of front wall 18 are spaced arms 85 having holes 86 for receiving threaded set screws 87 (FIG. 2) which also are receivable in the spaced threaded openings 86' (FIGS. 14 and 25) in spaced sides 12 of ram housing H and in relief sockets as 88 (FIG. 28) of bearing block B to hold the upper parts of spaced arms 85 against side walls 12 of housing H. The lower portions of spaced arms 85 may be said to be outwardly offset relative to spaced sides 83 although interconnected by the curved and overhanging shoulders 89 (FIGS. 6, 7, 29 to 34) to define spaced compartments 90 for reception of the forward part of cartridge or magazine SEC including the channel shaped and spaced rails 91 (FIGS. 7 and 35) in which staple element belt SEB is slidably guided.

Spaced rails 91 straddle platen or tongue 92 which extends rearwardly from the bottom part of guard plate 19 having strengthening rib 93 (FIG. 10) below notch 94. Spaced ends 95 (FIG. 4) of guard plate 19 are fixedly secured to the rear face of front wall 18 by brazing. Both the former blade F and driving blade D are suitably guided in vertical passageway or guideway 20 (FIGS. 3, 3A and 4) defined by front wall 18 and guard plate 19. Tongue 92 (FIG. 10) is provided with strengthening rib 95' merging with rib 93 (FIG. 9) which is offset rearwardly relative to the spaced bearing portions 96 to form channel 97 in which the longer leg 98 of loop shaped spring 99 is closely received. Leg 98 and short leg 100 of spring 99 frictionally straddle rib 93 (FIG. 3). The upper part of leg 98 and leg 100 normally converge (FIGS. 9 and 10). Terminal 101 of leg 98 is bent or biased forwardly. Leg 100 is provided with offset lip 102 to facilitate handling of spring clip 99. Biased terminal 101 serves to yieldingly hold driving blade D within guide channel 103 (FIGS. 3B and 4) of former blade F formed in part by its bent in ears 104 and also serves to yieldingly maintain former blade F against the inside and alined faces 105, 106 and 107 (FIGS. 3C, 4 and 5) of the front wall 18 of the sheath SH. In other words, spring clip 99 insures proper guidance of both the former and driving blade in guideway 20 which is in alinement with raceway RW (FIG. 3A).

Appropriately fixed by brazing to the inside faces of the rearwardly extending spaced sides 83 (FIGS. 5 and 8) of sheath SH are the spaced keepers K (FIG. 10) having alined notches 108 and alined cam faces 109. Keepers K (FIGS. 5 and 10) also include the inwardly turned flanges 110 which form with front faces 105, 106 and 107 raceway RW in which the former and driver blades F and D are slidably guided, as well as in the alined and communicating guideway.

Keepers K include alined recess 111 leading to and communicating with alined notches 108. Recesses 111 are in line with the spaced cutouts or recesses 84 interrupting spaced sides 83 of sheath SH.

Each of the spaced keepers K (FIG. 10) is provided with a stop lug 112 struck inwardly from a flange 110 and a respective side wall 113 of a keeper. These stop lugs 112 (FIG. 6) serve to limit insertion of the swingable case CS into sheath SH hereinafter more specifically described.

Suitably brazed to the inside faces of the interrupted sides 83 of sheath SH but spaced from sides 113 (FIGS. 8 and 10) of the spaced keepers K, are the depending sides 114 of seat 115, that is, sides 114 as well as lower rearwardly extending portions 116 thereof are fixedly anchored to sheath SH but to the rear of keepers K. Seat 115 is adapted to removably support the staple element cartridge or magazine SEC to permit the spaced resilient feeding fingers FF to straddle tongue 92 (FIG. 7) upon insertion of cartridge SEC into sheath SH. Spaced sides 83 of sheath SH also include alined openings 119 for receiving fulcrum pin 120 swingably sustaining case CS.

*Case CS*

Referring to FIGS. 1A, 11 to 13, the swingable case CS includes the U-shaped anvil carrier AC having bottom wall 121 and the upstanding spaced sides 122 provided with alined slots 123 and alined recesses 124. At the upper forward parts of spaced sides 122 the latter terminates in lugs 125 having top flat faces disposed below the level of surfaces 126 of sides 122. Integral with bottom wall 121 and bent upwardly therefrom are spaced legs 127 merged with cross bar 128 to define opening 129. Upstanding sides 122 are provided with the alined openings 130 for receiving fulcrum pin 120 traversing bores 119 of sides 83 of sheath SH (FIG. 1).

Fixedly anchored within anvil carrier AC is the anvil guard AG (FIGS. 11, 12 and 13) comprising spaced sides 131 interconnected by the inverted U-shaped bridge 132 from which forwardly extends tongue 133 which forms with platen or tongue 92 the staple channel or gap 54. Tongue 133 also acts to support the front end of the staple element belt SEB as it is unwound from roller in cartridge SEC and fed towards guideway 20. Depending sides 131 are provided with alined cutaway portions 134 (FIG. 11) communicating with the transversely alined notches 135 which are in registration or matched up with the transversely alined slots 123 (FIG. 12) of anvil carrier AC for slidably guiding latch LT utilized to cooperate with the fixed spaced keepers K to removably lock the swingable or pivoted case within sheath SH.

Anvil A includes bottom wall 136 (FIGS. 11 and 14) having upstanding sides 137 carrying at their rear ends fixed pin 138 to which one end of a helicoidal spring 139 (FIG. 3) is retained. The other or front end of spring 139 is retained on hook 140 (FIGS. 3 and 3A) of the pivoted staple gripping pawl 141 (FIGS. 3A and 7) having spaced gripping fingers 142 straddling the staple element supporting tongue 133. These fingers 142 removably clamp belt SEB against platen 92 of sheath SH when the foremost staple element is being formed and thereafter driven. Pivoted pawl 141 has spaced shoulders 143

(FIG. 7) rockably seated on bottom wall 121 of anvil carrier AC adjacent opening 144 of the latter in which reduced lug 145 projects. Pawl 141 also includes intermediate relief shoulders 146 disposed laterally of intermediate reduced portion 147 which freely projects into opening 148 of anvil A. Bottom wall 121 may be said to constitute fulcrum means for shoulders 143. When the former blade F is on its downstroke, it meets cam faces 61 of lips L, thus bodily shifting the anvil rearwardly. This action stretches the normally compressed spring 139 and pivoted pawl 141 swings rearwardly, thereby causing gripping fingers 142 to clamp staple element belt SEB against platen 92 and against movement. This gripping action is also maintained during the downstroke of driving blade D since the latter also acts on lips L to shift these lips clear and to the rear of raceway RW. Front face 149 (FIGS. 3 and 11) of opening 150A in bottom wall 136 of anvil A cooperates with stop or boss 150B projecting upwardly from bottom wall 121 of anvil carrier AC to limit rearward displacement of anvil A. Towards completion of the return strokes of both driver blade D and former blade F, spring 139 automatically shifts anvil A forwardly to arrange spaced lips L across raceway RW and within relief openings 81 of the front wall 18 of sheath SH. By such operation, the tiltable gripping pawl 142 releases its grip on belt or strip SEB. Rear face 150C (FIG. 3) of bottom wall 136 cooperates with boss 150B to limit forward displacement of anvil A.

Anvil heads 60 fixedly carry pin 150 which is surrounded by spacer sleeve 151 to properly hold heads 60 apart and against displacement towards each other, that is, against collapse due to the shock imparted to these heads on bending the foremost staple element SE. Anvil heads 60 are a part of the spaced extensions 152 (FIG. 14) from which lips L extend. Extensions 152 fixedly carry pin 153 having free terminals overhanging, that is, project laterally beyond the outside faces of extensions 152.

Figure 35A:
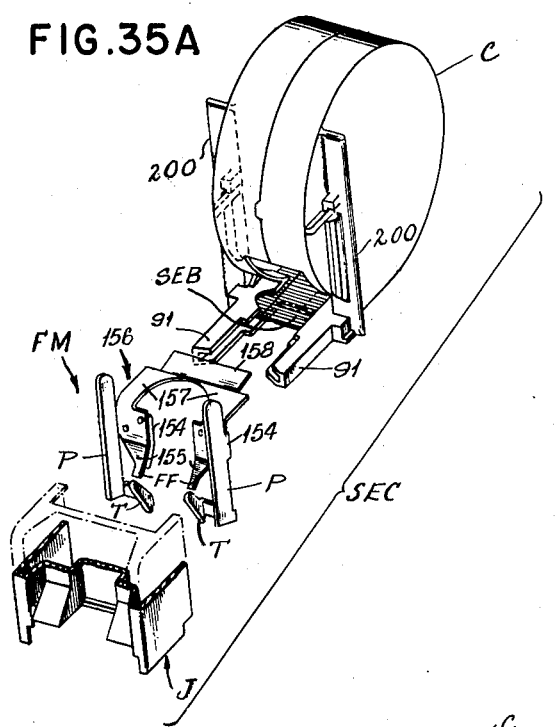
FIG. 35A is an exploded view of the cartridge or magazine shown in FIG. 35.

Since both pins 150 and 153 are fixed to anvil A, they move bodily therewith. Rearward movement of anvil A on downward displacement of blades D and F therefore causes rearward linear displacement of pin 153 which acts on spaced teeth T (FIGS. 7 and 35) to swing pawls P of cartridge SEC rearwardly to initiate the operation of the staple element feeding means FM (FIGS. 35, 35A, 36, 38) carried by the cartridge. The structure of the cartridge together with its staple element feeding means is more specifically described in my co-pending applications S.N. 349,862, filed April 20, 1953, and S.N. 561,897, filed January 27, 1956, and hence such structure and operation is just generally referred to. However, attention is called to the fact that fixedly attached to the inwardly turned extensions 154 of spaced pawls P (FIG. 35A) are the front legs 155 of the loop shaped leaf spring 156 having its rear legs 158 merged with reduced portion or bridge 158 adapted together with legs 157 to bear against the conainer C. Resilient feed fingers FF depend from front legs 155 and together with feeding teeth T idly pass over the staple element belt SEB when pawls P are swung rearwardly by pin 153 operating against spaced teeth T of swingable and slidable pawls P on the downward displacement of the former and driver blades. However, towards the completion of the return or up stroke of former F, spring 139 shifts anvil A forwardly. Therefore actuating pin 153 moves away from the spaced cam teeth T, causing leaf loop spring 156 to expand, that is, its front legs 155 diverge from the rear legs 157 and teeth T shift forwardly, that is, fingers FF and teeth T now grip the staple element belt SEB and shift the latter bodily forwardly, this is, in the direction indicated by the arrow in FIG. 39. Incidentally pawls P are swingably and slidably retained by jacket J suitably secured to container C as set forth in my application, S.N. 561,897, filed January 27, 1956.

With case CS swung out of sheath SH (FIG. 1A), helical spring 159 (FIGS. 1A, 8 and 13) automatically has shifted slidable latch LT forwardly, causing limbs 160 to abut stop faces 161 (FIG. 8) of front notches 135 of anvil guide AG (FIG. 11). Extending laterally of limbs 160 are webs 162 (FIGS. 8, 12A and 13) which carry serrated manipulating portions 163 for overhanging anvil carrier AC when case CS is swung out of sheath SH (FIG. 1A) and for extending beyond side walls 83 (FIG. 8) of sheath SH when case CS is nested or closed to be between the spaced keepers K (FIG. 8). Integral with webs 162 is the U-shaped portion 164 having notch 165 (FIG. 12A) adapted to receive web 166 of abutment clip 167 which includes upper forwardly extending spaced fingers 168 and the lower forwardly projecting lug 169. Fingers 168 and lug 169 frictionally clasp against the bridge of U-shaped portion 164. Web 168 also includes rearwardly disposed lug 170 (FIG. 13) fitting into helical spring 159 which bears against web 166 and against abutment fixed plate 171 having lug 172 fitting within the rear end of spring 159. Abutment plate 171 is appropriately anchored under hooks spaced 173 (FIGS. 3 and 11) at the rear upper ends of spaced sides 131 of anvil guide AG and against stop lug 174 extending upwardly from bottom wall 121 of anvil carrier AC.

Figure 6:
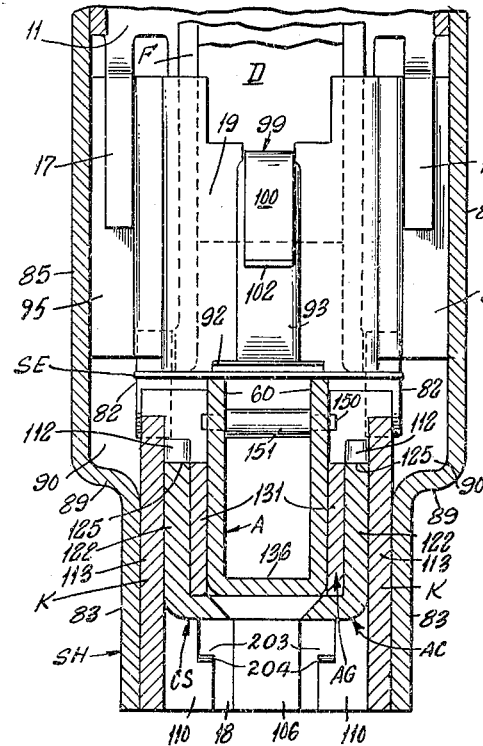
FIG. 6 is a sectional view substantially on the line 6—6 of FIG. 3.
Figures 17B, 21B, 23B:
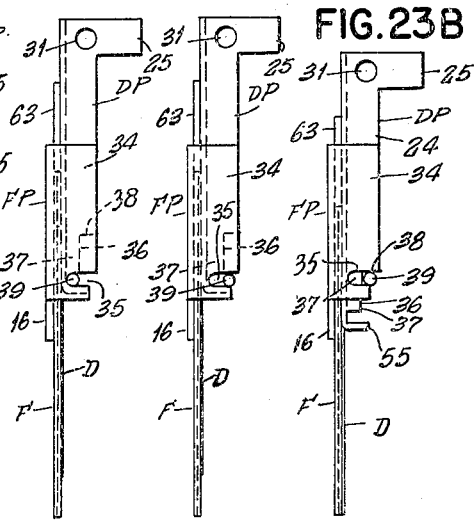
FIG. 17B is a side view of FIG. 17A showing the coupled relation of the former and driver plungers.
FIG. 21B is a side view of FIG. 21A, illustrating the locking pin uncoupled from the driving plunger.
FIG. 23B is a side view of FIG. 23A.
Figure 7:
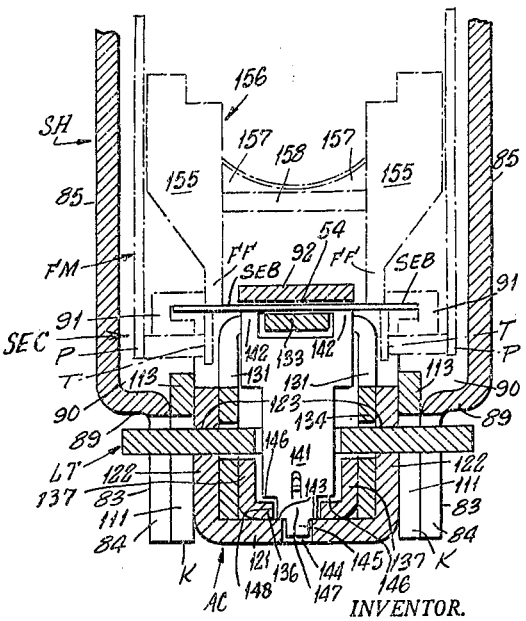
FIG. 7 is an enlarged sectional view on the line 7—7 of FIG. 3.

As shown in FIG. 8 limbs 160 of latch LT are within notches 108 of the keepers K. Consequently latch LT locks case CS within sheath SH. To open case CS, finger pressure is applied to manipulating portions 163 to shift latch LT rearwardly, thus compressing normally expanded helical spring 159. When limbs 160 clear notches 108 of the keepers K, case CS may be swung downwardly and rearwardly out of sheath SH. To again close case CS, the latter is swung upwardly towards sheath SH and the front ends of limbs 160 of latch LT contact the inclined cam surfaces 109 (FIG. 10) of keepers K, thus automatically shifting latch LT rearwardly against the resistance of spring 159. Eventually limbs 160 climb above cam surfaces 109 and snap into engagement with the wall or notches 108, at which time lugs 125 of anvil carrier AC abut stop 112 of the spaced keepers (FIG. 6).

*Operation*

Figure 2:
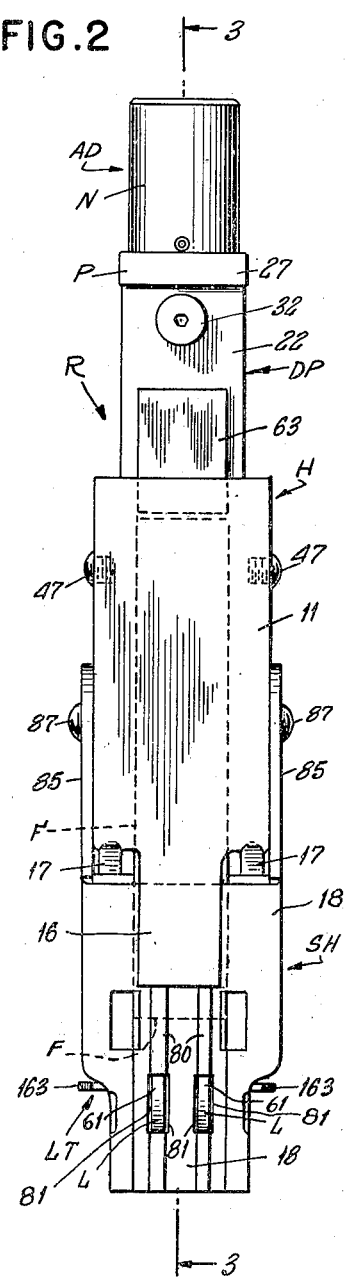
FIG. 2 is a front view of FIG. 1.

First case CS is unlocked from the keepers K and swung out of sheath SH. This action automatically unlocks hook 175 (FIGS. 1A and 3) from cross bar 128 at the rear end of anvil carrier AC. Hook 175 is fixed to the rear end of resilient sheet metal strap ST having secured at its front end bearing 176 rotatable about hinge pin 46 carried by bearing block B which is fastened to side walls 12 of housing H by set screws 47 as previously pointed out (FIGS. 1, 2 and 14). When hook 175 unlocks from bar 128, strap ST automatically straightens out.

With strap ST unlocked from case CS (FIG. 1A), cartridge or magazine SEC which permanently carries the feeding means FM (FIG. 35A) comprising the slideable and swingable pawls P and loop leaf spring 156 as well as a roll of staple elements ER, may now be inserted into sheath SH to permit the spaced staple element guide rails 91 (FIG. 7) of container C of cartridge SEC to straddle platen 92. Thereafter the flexible and resilient strap ST (FIG. 1A) is wrapped against container C and its hook 175 is interlocked with cross bar 128 (FIG. 3). Subsequently case CS is swung into sheath SH between keepers K and locked. It should be noted however, that heads or lugs 125 (FIG. 6) of the spaced sides 122 of anvil carrier AC, meet corner stop lugs 112 struck out of the fixed spaced keepers K, when case CS is closed, thus limiting insertion of the latter into sheath SH at which time spaced limbs 160 of latch LT snap into notches 108 (FIG. 10) of keepers K to also maintain anvil carrier AC against stops 112. By such action strap ST tightly holds fins 200 (FIGS. 1A, 35A) of cartridge SEC in place against spaced lugs 201 of spaced arms 85 of sheath SH, thus holding container C on seat 115 and tongue 133 of anvil guide AG supports the front part of the staple element belt SEB. Ram R may now be depressed. Hence both former blade F and driver blade D first move downwardly in unison, although former blade moves always in advance of the driving blade, the foremost staple element has been bent about anvil heads 60 to form the inverted U-shaped staple S. On the downward stroke of former F, the latter acts on lips L to shift anvil rearwardly out of the path of the former. When the former blade has completed its full downstroke, driving blade D moves downwardly relative to former blade to complete its downstroke to drive the formed staple out of the forming blade and out of raceway RW. Of course on the downward driving stroke of driving blade D, anvil A is completely withdrawn from raceway RW and from the path of movement of blade D since the latter acts on lips L to also cam anvil A rearwardly.

Since anvil A is shifted rearwardly, actuating pin 153 which is bodily movable with anvil A operates to swing pawls P rearwardly and therefore the spaced tooth means T and spaced resilient fingers FF are shifted idly over belt SEB at which time the latter is clamped against platen 92 and against movement by gripping fingers 142 of swingable pawl 141. After the driving and former blades D and F successively leave spaced lips on their return strokes, slidable anvil A is urged forwardly by spring 139 and pawl 141 releases belt SEB. Manifestly, retraction of anvil A carries with it pin 139 which now moves forwardly away from spaced teeth T. Promptly thereafter front legs 155 of loop spring 156 automatically swing forwardly and instantly the spaced gripping fingers FF and spaced tooth means T operate to initially grip and subsequently shift belt SEB to bring the foremost element SE thereof against spaced stops 82 to line up the foremost staple element SE with raceway RW and under channel 103 of former blade F.

Attention is now directed to FIGS. 29 to 34 which progressively illustrate the compensatory action of the former metal blade F in the matter of automatically adjusting itself to various uncontrollable manufacturing tolerances inherent in staple elements SE and even in itself. Former blade F has been previously described as split. By this is meant that former blade or former F has its lower end interrupted by the downwardly converging slot 180 dividing this former blade into spaced leaves 181 carrying ears 104 (FIGS. 3B and 3C) forming guide slot 103 for driving metal blade D. On the downward stroke of former F leaves 181 meet the foremost staple element SE on the anvil heads 60. Thus a terrific impact is applied to these leaves, permitting the latter to "give" or spread. In other words, the lower part of former blade F is resilient. It will also be noted that normally the lower part of former F defined by the spaced leaves 181 slightly converge downwardly, that is, these leaves are "toed in" such that width W (FIG. 29) below circular opening 182 which interrupts former blade F and which is in communication with the tapered slot 180, is less than width W2 of the upper uninterrupted part of the body of blade F above opening 182. Driver blade D is also provided along its spaced longitudinal margins with the spaced shallow relief recesses 183. Spaced leaves 181 at their lower parts are provided with terminal ears or lobes 184 which extend laterally of the lower portions of the tapering sides 185 of former blade F. Although leaves 181 spread slightly on impact with the foremost staple element SE, they automatically retract to closely hug legs 186 (FIG. 30) of formed staple S against anvil heads 60. Even if leaves 181 did not fully retract such retraction would be automatic after anvil heads 60 withdraw from the formed staple as lobes 184 would meet the cam faces 187 (FIG. 31) of the spaced and fixed cylindrical posts 188 in raceway RW, thus closely confining legs 186 of staple S between the spaced leaves 181 against spreading. In FIG. 32, former F is continuing its downstroke and driving blade D is still above and spaced from the formed staple S. However, spaced lobes 184 of the resilient former leaves 181 slide against the shanks of spaced posts 188 and are thus prevented from spreading, hence precluding spread of the spaced legs 186 of staple S now within former F. In FIG. 33, the former F has completed its full downstroke and driver blade D has just reached the bridge of staple S. Fixed posts 188 still resist spreading of former leaves 181, thus as heretofore, still holding legs 186 substantially perpendicular to the crown or bridge of its staple S. Of course, posts 188 (FIG. 5) are at the ends of raceway RW formed by front wall 18 of sheath SH and spaced flanges 110 of keepers K.

Former blade F is guided within raceway RW while driving blade D is guided between ears 104 in channel 103 (FIG. 3B) of former blade F. Anchored posts 188 are brazed in spaced corners of sheath SH defined at the confluences of sides 83 with front wall 18 thereof (FIG. 5). In FIG. 34, former blade F is still fully depressed and still held against spreading and driving blade D has completed its full downstroke, having ejected staple S. By the arrangement disclosed, it is apparent that former blade F is resilient during the bending or forming operation but is held against spreading during the time the driving blade drives the formed staple out of the forming blade.

According to the invention herein disclosed, the forming blade is deliberately "toed in" to take a staple element having small tolerances, nevertheless it is adequately compensatory to accommodate a staple element having a greater tolerance or combination of tolerances of the former and a staple element combined. In other words, the former blade herein is self adjusting even to the largest combination of tolerances incident to manufacture of the former and staple elements.

Referring to FIGS. 3A, 5A and 6, the spaced inwardly turned fixed flanges or rails 110 of spaced keepers K are provided with cutaway portions or recesses 203 (FIG. 5A) in alinement with relief openings 81 in the front ribbed or reinforced wall 18 of sheath SH. Constituting the bottom part of spaced recesses 203 are the inclined lead shoulders or cam faces 204. When case CS is closed, limbs 160 of latch LT bear against and are cammed rearwardly by the inclined cam faces 109 of the spaced keepers K. At this time the upper inclined faces 61 of spaced lips L yieldingly abut the spaced flanges 110 just below the inclined shoulders 204, thereby automatically shifting anvil A rearwardly. However, towards completion of closing of case CS, lower cam faces 202 of spaced lips L ride over the inclined lead shoulders 204 to permit projection of lips L through recesses 203 for entering raceway RW. When case CS is fully closed, that is, when lugs or heads 125 of anvil carrier AC (FIG. 3A) strike abutment stops 112 of the spaced keepers K, latch LT automatically retracts in spaced gaps 108 of keepers K, thereby holding lugs 125 against stops 112. Case CS is now fully closed and locked and spaced lips L are projecting across raceway RW and into the spaced relief openings 81 of the front reinforced wall 18. On opening of case CS, latch LT is pulled back to unlock from keepers K. Now case CS is swung out of sheath SH. Hence lower cam faces 202 of lips L bear yieldingly against inclined shoulders 204 and lips L pass rearwardly through spaced recesses 203 to be free of spaced keepers K.

The lower parts of ears 104 of the U-shaped split former F are appropriately flattened, crimped or creased to provide the laterally extending spaced lobes 184 which cooperate with the anchored posts 188 to hold leaves 181 of former F against spreading particularly during the latter part of the downstroke of driving blade D and of course during completion of the downstroke of the former after having formed the staple.

Various changes may be made in details of construction and arrangement of parts without departing from

I claim:

1. In a tacker, a normally raised reciprocable former blade having spaced resilient and slightly converging leaves for forming a rectilinear wire element over a shiftable anvil between said leaves during the early part of the downstroke of said former blade during which time said leaves are spaced laterally away from each other, a normally raised driving blade above said formed staple and guided by and between said leaves, and spaced fixed means cooperating with said leaves to resist lateral spreading of said leaves during the completion of the downstroke of the former blade and subsequently during the downstroke of the driving blade for ejecting the formed staple from the former blade.

2. In a tacker having a slidable anvil for supporting the foremost rectilinear element of a flexible wire staple element belt including a multiplicity of said rectilinear elements; a metal former blade comprising a web having spaced ears defining with said web a channel, the lower part of said web having a slot disposed longitudinally of said former blade and dividing the latter into spaced resilient leaves for bending said foremost staple element against said anvil to form a staple within said channel, said anvil and leaves having means for withdrawing said anvil from said formed staple to retain said staple in said channel, and a driving blade slidably guided in said channel above said staple for directing said staple out of said channel.

3. In a tacker having a slidable anvil for supporting the foremost rectilinear element of a flexible wire staple element belt including a multiplicity of said rectilinear elements; a metal former blade comprising a web having spaced ears defining with said web a channel, the lower part of said web having a slot disposed longitudinally of said former blade and dividing the latter into spaced resilient and converging leaves for bending said foremost staple element against said anvil to form a staple within said channel, said anvil and leaves having means for withdrawing said anvil from said formed staple to retain said staple in said channel, and a driving blade slidably guided in said channel above said staple for directing said staple out of said channel.

4. In a tacker having a slidable anvil for supporting the foremost rectilinear element of a flexible wire staple element belt including a multiplicity of said rectilinear elements; a metal former blade comprising a web having spaced ears defining with said web a channel, the lower part of said web having a slot disposed longitudinally of said former blade and dividing the latter into spaced resilient leaves for bending said foremost staple element against said anvil to form a staple within said channel, said anvil and leaves having means for withdrawing said anvil from said formed staple to retain said staple in said channel, means to resist lateral spreading of said leaves, and a driving blade slidably guided in said channel above said staple for directing said staple out of said channel when said leaves are resisted against lateral spreading.

5. In a tacker having a slidable anvil for supporting the foremost rectilinear element of a flexible wire staple element belt including a multiplicity of said rectilinear elements; a metal former blade comprising a web having spaced ears defining with said web a channel, the lower part of said web having sides converging downwardly and having a slot disposed longitudinally of said former blade and dividing the latter into spaced resilient and converging leaves for bending said foremost staple element against said anvil to form a staple within said channel, laterally extending lobes carried by said ears, said anvil and leaves having means for withdrawing said anvil from said formed staple to retain said staple in said channel, spaced fixed means cooperating with said lobes upon withdrawal of said anvil from said formed staple to resist lateral spreading of said leaves, and a driving blade slidably guided in said channel and normally above said staple for directing said staple out of said channel.

6. In a tacker having a slidable anvil for supporting the foremost rectilinear element of a flexible wire staple element belt including a multiplicity of said rectilinear elements; a metal former blade comprising a web having spaced ears defining with said web a channel, the lower part of said web having a slot disposed longitudinally of said former blade and dividing the latter into spaced resilient slightly converging leaves for bending said foremost staple element against said anvil to form a staple within said channel, said anvil and leaves having lower portions for withdrawing said anvil from said formed staple to retain said staple in said channel, a driving blade slidably guided in said channel and normally above said staple for ejecting said staple out of said channel, and fixed means cooperating with said leaves during ejection of said formed staple by said driving blade to prevent lateral spreading of said leaves.

7. In a tacker wherein a foremost rectilinear element of a flexible wire staple element belt is adapted to be fed over spaced anvil heads of a slidably guided anvil removably interposed within a raceway; a reciprocable and normally raised U shaped metal former blade having a lower split portion reciprocable in said raceway on the downward stroke of said former blade and defining spaced resilient and converging leaves for bending said foremost element against the sides of said anvil heads to form a staple within said former blade between said leaves during the early part of said downward stroke, said leaves and anvil having means to shift said anvil heads from said raceway shortly after forming of said staple, spaced and fixed posts disposed within said raceway cooperating with said former blade during the latter part of said downward stroke to resist lateral spreading of said leaves, and a driving blade at least in part guided by said former blade for ejecting the formed staple out of said former blade when said leaves are resisted against said lateral spreading.

8. In a tacker wherein a foremost rectilinear element of a flexible wire staple element belt is adapted to be fed over spaced anvil heads of a slidably guided anvil removably interposed within a raceway; a reciprocable and normally raised U shaped metal former blade having a lower split portion reciprocable in said raceway on the downward stroke of said former blade and defining spaced resilient leaves for bending said foremost element against the sides of said anvil heads to form a staple within said former blade between said leaves during the early part of said downward stroke, said leaves and anvil having means to shift said anvil heads from said raceway shortly after forming of said staple, means cooperating with said former blade during the latter part of said downward stroke to resist lateral spreading of said leaves, and a driving blade at least in part guided by said former blade for ejecting the formed staple out of said former blade when said leaves are resisted against said lateral spreading.

9. In a tacker wherein a foremost rectilinear element of a flexible wire staple element belt is adapted to be fed over spaced anvil heads of a slidably guided anvil removably interposed within a raceway; a reciprocable and normally raised U shaped metal former blade having a lower split portion reciprocable in said raceway on the downward stroke of said former blade and defining spaced resilient and converging leaves each having a lobe extending laterally from the lower part of said leaves for bending said foremost element against the sides of said anvil heads to form a staple within said former blade between said lobes during the early part of said downward stroke, said leaves and anvil having means to shift said anvil heads from said raceway shortly after forming of said staple, spaced and fixed posts disposed within said raceway and cooperating with said leaves, said posts comprising cam means cooperating with said lobes to shift said leaves towards each other and to retain said leaves between said posts, and a driving blade at least in part guided by said former blade for ejecting the formed staple out of said former blade when said leaves are resisted against said lateral spreading.

10. In a tacker, a sheath comprising a front wall and rearwardly extending side walls, an anvil carrying case, means carried by said side walls and pivotally sustaining said case to permit the latter to be swung into said sheath between said side walls, and stop means carried by said sheath and cooperating with said case to limit insertion of the latter between said side walls.

11. In a tacker, a sheath comprising a front wall and rearwardly extending side walls, an anvil carrying case, spaced keeper means within said sheath and secured to said side walls, means carried by said side walls and pivotally sustaining said case to permit the latter to be swung into said sheath between said keeper means, spaced stop means carried by said keeper means and cooperating with said case to limit insertion of the latter between said keeper means, and spring controlled latch means for removably interlocking with said keeper means to hold said case against said stop means.

12. In a tacker, a sheath comprising a front wall and rearwardly extending side walls, an anvil carrying case, means carried by said side walls and pivotally sustaining said case to permit the latter to be swung into said sheath between said side walls, and spaced rails within said sheath and anchored to said side walls to define with said front wall a raceway.

13. In a tacker for utilizing a flexible belt comprising a multiplicity of wire juxtapositioned rectilinear elements and adapted to have its foremost element bent into a staple against a shiftable anvil by a former blade slidably guiding a driving blade, a sheath comprising a ribbed front wall having spaced relief openings and having rearwardly extending side walls integral with said front wall, spaced keeper means within said sheath and secured to said side walls and having spaced rails spaced from said front wall to define therewith a raceway, a guide plate spaced from and above said rails and secured to said front wall to form therewith a guideway in alinement with said raceway, spaced stop means projecting from the inside face of said front wall to position the foremost element of said belt in alinement with said guideway and raceway, said rails having recesses in communication with said relief openings, and the bottom walls of said recesses defining inclined lead shoulders.

14. The tacker according to claim 13 wherein said guide plate includes a rib, and said former blade is loosely and freely guided in said guideway and closely guided in said raceway and said driving blade is guided by said former blade and rails, and a loop shaped spring comprises spaced legs of unequal length straddling said rib, one of said legs being biased and interposed between said rib and driving blade to hold the latter yieldingly against said former blade and the latter yieldingly against said inside face.

15. A ram for tackers, comprising; a U-shaped housing having a front wall and spaced sides including alined openings comprising vertical portions and rearwardly and downwardly inclined portions, a U-shaped normally raised former plunger within said housing and having side walls slidably guided by said sides and having alined notches, a U-shaped former blade carried by said former plunger, a U-shaped normally raised driving plunger guided by said former plunger and carrying a driving blade guided by said former blade, said driving plunger comprising spaced sides interrupted by alined recesses to define alined shoulders disposed to the rear of spaced limbs, a lip spaced from the lower parts of said limbs and carried by said driving plunger, and a pin disposed between said lip and the lower parts of said limbs and within said notches and vertical portions for coupling said plungers.

16. The ram according to claim 15 wherein during the downward stroke of said former plunger said pin is automatically actuated by said inclined portions to shift said pin to the rear of and completely out of path of movement of said limbs at the completion of the downward stroke of said former plunger, thereby unlocking the driving plunger from the former plunger allowing downward displacement of the driving plunger relative to the forming plunger.

17. In a tacker, a sheath comprising a front wall and rearwardly extending side walls, an anvil carrying case having spaced shoulders, spaced keeper means within said sheath and secured to said side walls, means carried by said side walls and pivotally sustaining said case to permit the latter to be swung into said sheath between said keeper means, spaced stop means carried by said keeper means and cooperating with said shoulders to limit insertion of the latter between said keeper means, and spring controlled latch means for removably interlocking with said keeper means to hold said case against said stop means.

18. In a tacker, a sheath comprising a front wall and rearwardly extending side walls, an anvil carrying case, spaced keeper means within said sheath and having spaced sides secured to said side walls, means carried by said side walls and pivotally sustaining said case to permit the latter to be swung into said sheath between said spaced sides, spaced stop means carried by said spaced sides and cooperating with said case to limit insertion of the latter between said keeper means, and spring controlled latch means for removably interlocking with said keeper means to hold said case against said stop means.

19. In a tacker, a sheath comprising a front wall and rearwardly extending side walls, an anvil carrying case, spaced keeper means within said sheath and having spaced sides secured to said side walls and having spaced rails defining with said front wall a raceway, means carried by said side walls and pivotally sustaining said case to permit the latter to be swung into said sheath between said spaced sides, spaced stop means carried by said spaced rails and cooperating with said case to limit insertion of the latter between said keeper means, and spring controlled latch means for removably interlocking with said keeper means to hold said case against said stop means.

20. In a tacker, a sheath comprising a front wall and rearwardly extending side walls, an anvil carrying case, spaced keeper means within said sheath and having spaced sides secured to said side walls and having spaced rails defining with said front wall a raceway, means carried by said side walls and pivotally sustaining said case to permit the latter to be swung into said sheath between said spaced sides, spaced stop means at the confluence of said rails and sides and carried by said keeper means and cooperating with said case to limit insertion of the latter between said keeper means, and spring controlled latch means for removably interlocking with said keeper means to hold said case against said stop means.

21. In a tacker for utilizing a flexible belt comprising a multiplicity of juxtapositioned rectilinear wire elements and adapted to have its foremost element bent into a staple against a shiftable anvil by a former blade slidably guiding a driving blade, a sheath comprising a front wall having spaced relief openings and having rearwardly extending side walls integral with said front wall, spaced keeper means within said sheath and secured to said side walls and having spaced rails spaced from said front wall to define therewith a raceway, and stop means projecting from the inside face of said front wall to position the foremost element of said belt in alinement with said raceway.

22. In a tacker for utilizing a flexible belt comprising a multiplicity of juxtapositioned rectilinear wire elements and adapted to have its foremost element bent into a staple against a shiftable anvil by a former blade slidably guiding a driving blade, a sheath comprising a ribbed front wall having spaced relief openings and having rearwardly extending side walls integral with said front wall, spaced keeper means within said sheath and secured to said side walls and having spaced rails spaced from said front wall to define therewith a raceway, and stop means integral with said front wall and overhanging the inside face thereof to position the foremost element of said belt in alinement with said raceway.

23. In a tacker for utilizing a flexible belt comprising a multiplicity of juxtapositioned rectilinear wire elements and adapted to have its foremost element bent into a staple against a shiftable anvil by a former blade slidably guiding a driving blade, a sheath comprising a ribbed front wall having spaced relief openings and having rearwardly extending side walls integral with said front wall, spaced keeper means within said sheath and secured to said side walls and having spaced rails spaced from said front wall to define therewith a raceway, a guide plate spaced from and above said rails and secured to said front wall to form therewith a guideway in alinement with said raceway, and spaced stop means integral with and projecting from the inside face of said front wall to position the foremost element of said belt in alinement with said guideway and raceway.

24. In a tacker for utilizing a flexible belt comprising a multiplicity of juxtapositioned rectilinear wire elements and adapted to have its foremost element bent into a staple against a shiftable anvil by a former blade slidably guiding a driving blade, a sheath comprising a front wall and rearwardly extending side walls integral with said front wall, spaced keeper means within said sheath and secured to said side walls and having spaced rails spaced from said front wall to define therewith a raceway, a guide plate spaced from and above said rails to define therewith alined gaps in communication with said raceway and secured to said front wall to form therewith a guideway in alinement with said raceway and communicating therewith and said gaps, and stop means integral with said front wall and projecting from the inside face of said front wall to position the foremost element of said belt in alinement with said guideway and raceway.

25. In a tacker for utilizing a flexible belt comprising a multiplicity of juxtapositioned rectilinear wire elements adapted to have its foremost element bent into a staple against a shiftable anvil by a former blade slidably guiding a driving blade, a sheath comprising a ribbed front wall having spaced relief openings and having rearwardly extending side walls integral with said front wall, spaced keeper means within said sheath and secured to said side walls and having spaced rails spaced from said front wall to define therewith a raceway, a guide plate spaced from and above said rails and secured to said front wall to form therewith a guideway in alinement with said raceway, spaced stop means integral with and projecting from the inside face of said front wall to position the foremost element of said belt in alinement with said guideway and raceway, and said rails having recesses in communication with said relief openings.

26. In a tacker for utilizing a flexible belt comprising a multiplicity of juxtapositioned rectilinear wire elements and adapted to have its foremost element bent into a staple against a shiftable anvil by a former blade slidably guiding a driving blade, a sheath comprising a front wall having rearwardly extending side walls integral with said front wall, spaced keeper means within said sheath and secured to said side walls and having spaced rails spaced from said front wall to define therewith a raceway, a guide plate spaced from and above said rails and secured to said front wall to form therewith a guideway in alinement with said raceway, stop means integral with and projecting from the inside face of said front wall to position the foremost element of said belt in alinement with said guideway and raceway, said guide plate having a hollow rib, said former blade being loosely guided in said guideway and closely guided in said raceway and said driving blade being guided by said former blade and rails, and a loop shaped spring embodying spaced legs for embracing said rib, and one of said legs being interposed between said rib and driving blade to hold the latter yieldingly against said former blade and the latter yieldingly against said inside face.

27. A ram for tackers comprising; a normally raised former plunger carrying a former blade, a normally raised driving plunger slidably guided by said former plunger and carrying a driving blade slidably guided by said former blade, pin means disengageably coupling said former and driving plungers until the completion of the downward stroke of said former blade, and a housing for slidably guiding said former plunger and having cam means for slidably guiding and shifting said pin means to be free of said driving plunger on the completion of said downward stroke of said former blade to allow completion of the downward stroke of said driving blade.

28. A ram for tackers comprising; a U-shaped housing having a front wall and spaced sides including alined openings comprising vertical portions and rearwardly and downwardly inclined portions, a U-shaped normally raised former plunger within said housing and having side walls slidably guided by said sides and having alined notches, a U-shaped former blade carried by said former plunger, a U-shaped normally raised driving plunger slidably guided by said former plunger and carrying a driving blade slidably guided by said former blade, said driving plunger having spaced sides including alined recesses to define spaced limbs and spaced shoulders arranged to the rear of said limbs, a lip spaced from the lower parts of said limbs and carired by said driving plunger, and a pin removably disposed between said lip and the lower parts of said limbs and movably arranged within said notches and slidably guided in said vertical and inclined portions for coupling said plungers to move together in unison until towards the completion of the downward stroke of said former blade.

29. The ram according to claim 28 wherein the ends of said pin are slidably disposed in said openings and are actuated by corresponding walls of said inclined portions to shift said pin to clear said limbs at the completion of the downward stroke of said former blade for uncoupling said driving plunger from said former plunger to permit the driving plunger to complete its downward stroke.

30. The ram according to claim 29 wherein said lip constitutes means for shifting said pin under said limbs on the upward stroke of said plunger for coupling said plungers together.

References Cited in the file of this patent

UNITED STATES PATENTS

| | | |
|---|---|---|
| 579,927 | Keith | Mar. 30, 1897 |
| 1,637,357 | Svenson | Aug. 2, 1955 |
| 2,733,440 | Jenny | Feb. 7, 1956 |

FOREIGN PATENTS

| | | |
|---|---|---|
| 1.090.179 | France | Mar. 28, 1955 |